United States Patent Office 2,749,231
Patented June 5, 1956

2,749,231

BROMOPHENYL CYANOACRYLIC ACIDS AND DERIVATIVES

Waldo B. Ligett, Pontiac, and Calvin N. Wolf, Detroit, Mich., assignors to Ethyl Corporation, New York, N. Y., a corporation of Delaware No Drawing. Application May 6, 1952,
Serial No. 286,434

15 Claims. (Cl. 71—2.6)

This invention relates to a novel class of synthetic organic compounds which exhibits important, and in many respects heretofore unknown, responses in the growth processes of plants. More specifically, our invention relates to materials containing the α-cyano-β-bromophenyl acrylic grouping.

Much attention has been directed in recent years to providing controlled regulation of the morphological processes of living plants, wherein the term "plant" is used in the broadest sense of the term. A number of materials have been described, both naturally occurring and synthetic, which produce morphological responses in plants. In general, more or less specificity has been noted, both with regards to the plant species effected and to method of application. Likewise, the effects appear to be limited to narrow concentration ranges of the material being applied. Furthermore, chemicals quite specific in structure or formulation have been required.

One important effect is the stimulation of growth. This can take many forms but in general each such effect can be achieved by only a limited number of materials. Among the growth stimulation effects can be noted a development of oversize plant parts as, for example, the development of blossoms or fruits of larger than normal size. Other examples of growth stimulation include increasing the rate of formation of root systems principally from cuttings.

Another important effect achieved by certain growth regulants includes the suppression of one or more growth processes. Certain materials are known to be capable of preventing the formation of the abscission layer of cells in plant appendages. This effect finds application in preventing premature drop of fruit.

Still another type of growth regulation is shown by a general increase in the rate of growth of a plant and usually materials which are effective in this respect when employed in large concentrations exhibit a growth destruction effect as a result of over-stimulation of the growth process. Such materials which do not permit normal growth in the useful growth stimulation range of concentrations, cause more or less deformities in the plant such as bending or epinasty of the stem.

One characteristic of a growth regulant is translocation, that is, when applied at a specific point in the plant organism the effect may be observable at a site distant from the application. For this reason it was at one time customary to refer to such materials as plant hormones by analogy to the materials which have a hormonic effect in animal organisms.

In the materials previously known control of the desired effect has been difficult to achieve and the period of application in the growth cycle has been of extreme importance. Furthermore, the selectivity of the material towards the plant organism has, in most instances, been insufficient to permit widespread application under field conditions without subjecting other plants in the area to the effect of the materials being applied with consequent destructive effects.

It is an object of our invention to provide a novel chemical grouping having plant growth regulant properties. It is a further object of our invention to provide materials which, when applied to living plants, can produce important and novel morphological responses in a controlled manner. Other objects of our invention will appear from the further description hereinafter.

The novel compounds which we have discovered comprise the α-cyano-β-bromophenyl acrylic structure. We have found that when a bromine atom is present in the β-phenyl group of the α-cyano-β-phenyl acrylic structure high morphological activity exists. In the free acid form our compounds comprise α-cyano-β-p-bromophenyl) acrylic acid, α-cyano-β-(m-bromophenyl) acrylic acid, and α-cyano-β-(o-bromophenyl) acrylic acid.

In general the plant response chemicals of our invention possess the structure

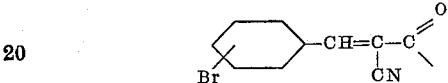

In addition to the free acids of the above growth regulant compounds we have found that by forming derivatives of the carboxylic group we retain the activity associated with the characteristic structure of the compounds of our invention while often changing secondary properties which for certain applications place the materials in a more practical form for use. However, the grouping portrayed graphically above is the active unit of our materials, and such activity remains on forming carboxylic derivatives thereof. In other words, the organism responds to this grouping. For example by converting the free acid to metallic salts thereof, the solubility of our materials can be changed to permit dilution of our compounds in water or certain other polar solvents. Furthermore, the volatility is thus controlled to make it more suitable for certain applications. However, by such modification the growth response characteristic is not destroyed. For example the alkali metal salts such as those of lithium, sodium and potassium provide derivatives of water solubility; also the salts of the alkaline earth metals, for example magnesium, calcium, strontium and barium can be employed. Likewise for certain applications we prefer the heavy metal salts such as, for example, nickel, chromium, copper, zinc, silver, mercury, molybdenum, antimony, bismuth, tin, aluminum, manganese, iron and lead salts. While the employment of our growth regulant materials in the form of the metallic salts does not substantially effect their morphological activity, certain embodiments thereof possess important secondary properties, such as for example imparting fungicidal, bacteriostatic, or antiseptic activity along with the growth regulant activity. Further important improvements in ease of formulation and weathering characteristics can be so achieved.

Other salts of our materials can be formed without materially altering the growth regulant properties, such as for example the ammonium salts, hydrazonium salts and other nitrogen-containing salts, such as salts formed with alkyl, aryl and other organo-substituted nitrogen bases. Examples of such nitrogen-containing groups which form salts with our compounds include trimethylammonium, triethylammonium, phenylammonium, monoethanol-, diethanol- and triethanolammonium salts, methyldipropylammonium and tribenzylammonium salts. Furthermore, forming ammonium salts with high molecular weight organic radicals such as for example the methyl-ethyl-octadecyl-ammonium group, can provide materials having bacteriostatic effects and important solubility relationships and surface activity. Such modification of the α-cyano-β-bromophenyl acrylic structure can be employed to impart desirable solubility, weathering, volatility and formulating characteristics as well as for some purposes modify the prevalent properties of the growth response chemical.

In general such ammonium and hydrazonium salts of the α-cyano-β-(bromophenyl) acrylates of our invention contain the grouping

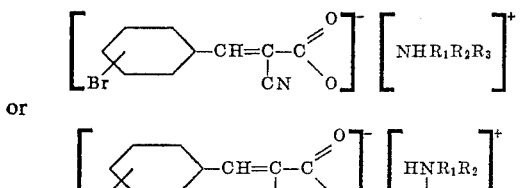

wherein R₁, R₂, R₃ and R₄ include hydrogen, alkyl, cycloalkyl, aralkyl, aryl or combinations thereof as well as substitution products thereof. Thus, such R groups can be hydrogen, methyl, ethyl, propyl, isopropyl, butyl, sec.-butyl, isobutyl, tert.-butyl, the isomeric amyl, hexyl, heptyl, octyl, nonyl, decyl groups, and the like including higher alkyl groups such as stearyl, lauryl, oleyl, octadecyl and the like; cycloalkyl such as cyclobutyl, cyclopentyl, cyclohexyl and the like and substituted cycloalkyl such as methylcyclopentyl, methylcyclohexyl, dimethylcyclohexyl, isopropylcyclohexyl and the like; aralkyl such as benzyl, α-phenethyl, β-phenethyl, α-phenyl-β-chloroethyl, ar.-chlorobenzyl, ar.-nitrobenzene; aryl groups such as phenyl, α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-dichlorophenyl, nitrophenyl, acetophenyl and the like. In general, such groups R₁, R₂, R₃ and R₄ can contain negative substituents such as halogen, hydroxyl, hydrocarbonoxy, carbonyl, nitro, nitroso, nitramino, amino, substituted amino, hydroxylamino, sulfhydryl, sulfide, imino and the like groups to further modify the primary growth response characteristics with regard to toxicity, volatility, ease of formulation or produce secondary effects such as penetration and the like.

Further derivatives of our novel growth regulants comprise the thiouronium salts of the α-cyano-β-bromophenyl acrylic acids.

A similar class of derivatives of our α-cyano-β-bromophenyl acrylic growth regulants comprise the organometallic salts. Typical examples of such salt-forming groups which we can incorporate into our growth regulant structure include alkyl-, aryl- and alkylaryl-metallo groups. Generally, such embodiments conform to the structure

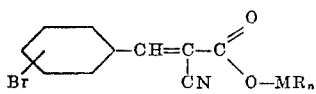

wherein M is any metal which will form organometallic compounds of suitable stability, n is an integer which is one less than the valence of the metal and R is one or more hydrogen, organo, alkyl, cycloalkyl, aryl, aralkyl, alkaryl, alkoxy or aryloxy groups or substituted derivatives thereof and combinations thereof. Typical examples of such metals include mercury, tin, lead, antimony, bismuth, arsenic, germanium, aluminum, boron, gallium, silicon, zinc, tellurium and the like. Thus, for example methylmercuri, phenylmercuri, ethylmercuri, dibenzyltin, diphenyltin, diethyltin, triethyltin, triphenyltin, diphenylgermanium, dibenzylgermanium, triethylgermanium, dimethylphenylgermanium, ethylthallium, diethylsilicon, dimethylsilicon, diphenylbismuth, ethylcadmium, phenylcadmium, dimethylaminophenylmercuri, ethylmercaptomercuri, tolylmercuri, α-furfurylmercuri, methyltelluri, ethyltelluri, phenyltelluri, trimethyltelluri, dimethylphenyltelluri, dimethylboro, methylphenylboro, dicyclohexylboro, borohydro, boroetherate, dimethyl-p-anisylboro, dimethylarseno, diphenylarseno, methylphenylarseno, dimethylaluminum, diethylaluminum, methylphenylaluminum, ethylzinc, isopropylzinc and methylzinc, α-cyano-β-bromophenyl acrylates, and the like can be prepared and retain the growth regulant characteristics.

In addition to the salt-like derivatives of our compounds, we can employ them in the form of esters. Among the organic esters which we can employ are the alkyl esters such as for example methyl, ethyl, n-propyl, isopropyl, butyl and isomeric butyl, amyl, hexyl, heptyl, octyl, nonyl, and decyl esters, as well as the higher aliphatic esters such as stearyl, lauryl, and oleyl, esters; cycloalkyl esters such as cyclobutyl, cyclopentyl, cyclohexyl, esters of the polyethers and polyhydric alcohols such as for example esters of pentaerythritol, ethylene glycol, methoxyethanol, ethoxyethanol, butoxyethanol, butoxyethoxy propanol, polyethylene and polypropylene glycols and the various carbitols and cellosolves, and the like. Likewise aryl esters can be employed and in some instances these are preferred. Examples of such esters include the phenyl, tolyl, xylyl, p-diphenyl, ter.-phenyl, o-diphenyl, α-naphthyl, β-naphthyl esters and the like. We have also found that by substituting other groups or radicals into such organic esters we can achieve important improvements in the applicability of our materials. Thus, in the alkyl and aryl esters of our compounds enumerated above we can provide the corresponding esters wherein negative groups such as a halogen including chlorine, bromine, fluorine and iodine, or various nitrogen-containing radicals such as nitro, nitroso, amino, substituted amino groups, or sulfur-containing radicals such as for example mercaptyl, substituted mercaptyl, sulfide, sulfonic, sulfonyl and sulfonamide radicals and the mixtures thereof are incorporated therein. Thus, we can form the β-chloroethyl, β-bromoethyl, γ-fluoropropyl, 2-hydroxycyclohexyl, β-thiocyanoethyl, β-mercaptoethyl, 4-aminobutyl, diethylaminomethyl, β-dimethylaminoethyl, β-sulfoethyl, and the like, α-cyano-β-bromophenyl acrylates. Likewise p-tolyl, p-anisyl, 2-nitrophenyl, 2,4-dichlorophenyl, pentachlorophenyl, 2,4,5-trichlorophenyl, p-aminophenyl, o-(N,N-dimethylaminophenyl), α-(4-nitronaphthyl), and the like, α-cyano-β-bromophenyl acrylates produce novel plant response effects. Similarly typical aralkyl esters provide these effects such as for example β-phenethyl, α-(β-naphthylethyl), benzyl, p-nitrobenzyl, p-chlorobenzyl, 2,4-dichlorobenzyl, 2,4,5-trichlorobenzyl and the like esters of α-cyano-β-bromophenyl acrylic acid, as well as the heterocyclic esters thereof such as for example furfuryl, and the like.

Other derivatives of the carboxylic function of the growth regulant compositions of our invention include those wherein nitrogen-containing groups replace the hydroxyl of the carboxylic acid. Typical examples of such embodiments of the compounds of our invention include amide and substituted amide groups. Thus, we can provide N-methyl, N-ethyl, N-dimethyl, N-diethyl, N-methylpropyl, N-phenyl, N-tolyl, N-xylyl, N-methyl-N-phenyl, N-ethyl-N-phenyl, N-benzyl, N-n-butyl, N-hexyl, N-p-chlorophenyl, N-2,4-dichlorophenyl, N-2,4,5-trichlorophenyl, N-pentachlorophenyl, N-p-diphenyl, N-o-diphenyl, N-o-nitrophenyl, N-p-aminophenyl, N-o-dimethylaminophenyl, N-p-tolysulfonyl, N-p-dimethylaminomethylphenyl, N-p-anisyl, N-α-naphthyl, N-β-naphthyl, N-α-(2-aminonaphthyl), N-(p-chlorobenzyl), N-(β-phenethyl), N,N-dibenzyl, N-methyl-N-benzyl, N-(β-hydroxyethyl)-N-benzyl, and the like, α-cyano-β-(bromophenyl) acrylamides as well as the unsubstituted acrylamides and N-(α-cyano-β-bromophenyl acrylyl) morpholine and similar heterocyclic amides, as well as N-(α-pyridyl), N-(β-pyridyl) N-(γ-pyridyl), N-(α-thiophenyl), N-(β-quinoyl), N-(α-pyridyl)-N-benzyl and the like α-cyano-β-bromophenyl acrylamides.

Furthermore, the compounds of our invention comprise the thiol acid derivatives of α-cyano-β-bromophenyl acrylic acid, such as

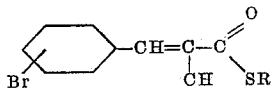

wherein R is hydrogen as in the thiol acids or alkyl, cycloalkyl, aryl, alkylaryl, aralkyl, and the like as in the thiol esters. Thus our compounds comprise α-cyano-β-bromophenyl thiol acrylic acid as well as, for example, the methyl, ethyl, propyl, isopropyl, butyl, sec.-butyl, isobutyl, ter.-butyl, the isomeric amyl, hexyl, heptyl, octyl, nonyl, decyl, stearyl, lauryl, oleyl, octadecyl, cyclobutyl, cyclopentyl, cyclohexyl, methylcyclopentyl, methylcyclohexyl, dimethylcyclohexyl, isopropylcyclohexyl, benzyl, β-phenethyl, α-phenethyl, α-phenyl-β-chloroethyl, ar.-chlorobenzyl, ar.-nitrobenzene; aryl groups such as phenyl, α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-dichlorophenyl, nitrophenyl, acetophenyl esters and the like. Furthermore, other thiol acid derivatives of our compounds possess growth response characteristics such as, for example, the metallic, ammonium, hydrazonium, and organo-metallic salts as above.

Still other derivatives of the α-cyano-β-bromophenyl acrylic growth response structure of our invention which have utility in providing morphological responses and are useful as intermediates in further chemical modification include the acid halides, among which the more useful are the chlorides and bromides.

In the following non-limiting, illustrative examples of methods of preparing specific examples of the compounds of our invention and description of certain properties thereof, all parts and percentages are by weight.

EXAMPLE I

*Sodium salt of α-cyano-β-(p-bromophenyl) acrylic acid.*—In a reactor provided with an agitator and containing 34 parts of water at a temperature of 25° C. was added 8.5 parts of cyanoacetic acid. To the resulting solution was added a premixed solution of 5.3 parts of sodium carbonate in 9 parts of water, followed by a solution of 0.6 part of sodium hydroxide in 42 parts of water. This mixture was heated to a temperature of about 40° C. and 17.5 parts of p-bromobenzaldehyde was added with vigorous agitation for a period of two hours. Upon cooling to 25° C. the sodium salt of α-cyano-β-(p-bromophenyl) acrylic acid precipitated and was recovered by filtration. This product was 18.6 parts.

EXAMPLE II

*α-cyano-β-(p-bromophenyl) acrylic acid.*—The sodium salt of α-cyano-β-(p-bromophenyl) acrylic acid prepared as in the foregoing example was dissolved in water and this solution was treated with six normal hydrochloric acid in amount sufficient to acidify the salt. The product which precipitated almost quantitatively was recovered by filtration and recrystallized from 50 per cent aqueous ethanol. The resulting white crystals melted at 208 to 210° C. and were found by analysis to contain 31.4 per cent bromine, corresponding to the formula $C_{10}H_6O_2NBr$ which requires 31.7 per cent bromine.

The α-cyano-β-bromophenyl acrylic growth response agents of our invention can exist in two geometrically isomeric forms in accordance with the following formulas:

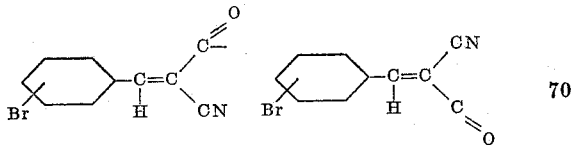

According to the procedure of Example II the stable isomer is formed. This material can be converted to the labile form by suitable methods such as heating in the presence of ultraviolet irradiation and such labile isomer can be reconverted to the stable form.

Similarly other growth regulants of our invention are prepared in excellent yield by the procedures of Examples I and II. Thus, condensation of o-bromobenzaldehyde with sodium cyano-acetate followed by acidification produces α-cyano-β-(o-bromophenyl) acrylic acid, and condensation of sodium cyanoacetate with m-bromobenzaldehyde followed by acidification yields α-cyano-β-(m-bromophenyl) acrylic acid. Other salts can be prepared by employing the appropriate salt of cyanoacetic acid during the condensation step between the bromobenzaldehyde and the cyano-acetate. Thus, potassium α-cyano-β-(m-bromophenyl) acrylate is precipitated from the reaction mixture of potassium cyano-acetate with m-bromobenzaldehyde, and ammonium α-cyano-β-(o-bromophenyl) acrylate is produced directly by treating ammonium cyanoacetate with o-bromobenzaldehyde.

Esters of α-cyano-β-bromophenyl acrylic acid are conveniently prepared by reacting the appropriate ester of cyanoacetic acid with the bromobenzaldehyde in the presence of a catalyst such as, for example, piperidine benzoate. By employing a water immiscible solvent such as benzene, toluene, or the like and conducting the reaction at the boiling point of the mixture, the water formed is removed by azeotropic distillation to drive the reaction to completion. Thus, ethyl cyanoacetate reacts with p-bromobenzaldehyde to produce ethyl α-cyano-β-(p-bromophenyl) acrylate in excellent yield. α-furfuryl cyanoacetate reacts with o-bromobenzaldehyde to produce in excellent yield the effective growth response agent, α-furfuryl α-cyano-β-(o-bromophenyl) acrylate. Further examples of such manufacturing processes include the preparation of cyclohexyl, ethylene glycol, butoxyethyl and the like esters of our α-cyano-β-bromophenyl acrylic acids by reacting the bromobenzaldehyde with cyclohexylcyanoacetate, and butoxyethyl cyanoacetate, and ethylene glycol monocyanoacetate.

Salts such as the diethanolamine and triethanolamine salts of our α-cyano-β-bromophenyl acrylic acids are simply prepared by treating in an aqueous system the α-cyano-β-bromophenyl acrylic acid with diethanolamine or triethanolamine, for example, and in most instances the salts separate readily and in good yield to produce growth response agents of high purity.

Organometallic salts of our α-cyano-β-bromophenyl acrylic acids are readily prepared by metathesis between, for example, a sodium salt of the acrylic acid and an organometallic halide. Thus, for example, to prepare the phenylmercuri salt of α-cyano-β-(p-bromophenyl) acrylic acid we treat sodium α-cyano-β-(p-bromophenyl) acrylate with phenylmercuric chloride at about 25° C. in an aqueous medium. The phenylmercuri salt separates in good yield and high purity and, on recovery by filtration, is ready for use.

We have described the preparation of the α-cyano-β-bromophenyl acrylic acids. Furthermore, we have shown illustrative examples of methods of preparing carboxylic derivatives thereof. In general, the manufacture of such derivatives is achieved by methods well known to those skilled in the chemistry of organic carboxylic acids. Other methods than those illustrated will be apparent.

Compounds containing the α-cyano-β-bromophenyl acrylic structure possess the remarkable property of plant growth control without visible injury. In some applications in certain varieties of plants this property is evidenced by a growth inhibition or suppression while in others or at controlled concentrations by a growth stimulation. Thus when applied to young growing plants, normal growth can be suppressed and proceed at a decreased level of activity. In general, the effects produced by the novel structure of our invention occur through a variety of methods of application. Thus in leafy plants the application can be made directly to the leaf structure, either to the entire leaf structure or to a single leaf. In the latter instance, this clearly demonstrates a translocation of the active ingredient throughout the plant structure. For example, when a single leaf of a tomato plant was treated with a suspension of α-cyano-β-(p-bromophenyl) acrylic acid at a 1 per cent aqueous concentration, the treated leaf died but no other immediate effects were noted from the balance of the plant. Ten days later, the treated plant was observed to be only one-third the height of a control plant. At the end of a thirty day period the treated plant was only one-half the height of the control plant.

It is frequently noted in treating growing leafy plants with the growth regulants of our invention that apical dominance is decreased, permitting activity of the axillary buds, whereas response to other growth regulants of a suppressive nature is an overall slowdown of growth.

To further illustrate the nature of the growth suppressant effect of the compounds of our invention, test applications were made upon young (5 inch) tomato plants of the Bonny Best variety. In these demonstrations, a suspension of the growth regulant in water containing 0.1 per cent Tween 20 as a wetting agent was sprayed to the extent of 20 milliliters of formulation on five inch plants growing four to a pot. One plant in each pot was carefully protected from the spray and served as a control. Observations were made of both the treated and control plants at periodic intervals. The per cent growth in comparison with the check plants was measured at definite intervals. Typical of the normal growth, at the end of 21 days the control plants attained a height of fourteen inches. Although there was no tissue damage in the treated plants and the color was normal the treated plants exhibited formative effects, being unusually bushy with numerous axillary branches. As the observations were continued beyond the indicated period the growth levels of the treated plants began to approach the growth level of the control plants. Upon further observation, the treated plants continued to develop with the formation of buds, flowers and fruits. Thus, we have established that the α-cyano-β-(p-bromophenyl) acrylic structure is responsible for the growth response effect. Thus the free acids, the metal salts, esters, diethanolammonium, triethanolammonium and organo metallic salts, and amide derivatives and the like showed growth regulation. It has been further established that both geometrically isomeric forms (stable and labile) of the α-cyano-β-bromophenyl acrylic structure show distinct hormone-like effect upon growing tomato plants. Typical data are illustrated in the following table.

TABLE

*Increase in height of tomato plants, percent of control, after treatment with growth regulant*

| Compound | Concentration, Percent | Days After Treatment | | |
|---|---|---|---|---|
|  |  | 9 | 18 | 30 |
| α-Cyano-β-(p-bromophenyl) acrylic acid | 0.4 | 6 | 13 | 15 |
|  | 0.2 | 40 | 24 | 23 |
|  | 0.1 | 34 | 27 | 27 |
|  | 0.05 | 38 | 34 | 40 |

Other typical α-cyano-β-bromophenyl acrylic growth regulants exhibiting similar effects on tomato or other growing plants include: α-cyano-β-(m-bromophenyl) acrylic acid, α-cyano-β-(o-bromophenyl) acrylic acid, sodium α-cyano-β-(p-bromophenyl) acrylate, lithium α-cyano-β-(m-bromophenyl) acrylate, barium α-cyano-β-(o-bromophenyl) acrylate, ethyl α-cyano-β-(p-bromophenyl) acrylate, β-chloroethyl α-cyano-β-(p-bromophenyl) acrylate, triethyllead α-cyano-β-(o-bromophenyl) acrylate, dimethylaminophenylmercuri α-cyano-β-(p-bromophenyl) acrylate, α-furfuryltin α-cyano-β-(m-bromophenyl) acrylate, β-dimethylaminoethyl α-cyano-β-(p-bromophenyl) acrylate, butoxypolyethoxy α-cyano-β-(p-bromophenyl) acrylate, 2,4-dichlorophenyl α-cyano-β-(o-bromophenyl) acrylate, (mono - α - cyano - β - (o-bromophenyl) acrylate) of ethylene glycol monomethylether, di-(α-cyano-β-(p-bromophenyl) acrylate) of ethylene glycol, butoxy-propoxypropyl ester of α-cyano-β-(p-bromophenyl acrylic acid, vinyl α-cyano-β-(p-bromophenyl) acrylate, isoprene α-cyano-β-(m-bromophenyl) acrylate, butyl α-cyano-β-(p-bromophenyl) acrylate, copper α-cyano-β-(p-bromophenyl) acrylate, tetramethylhydrazonium α-cyano-β-(p-bromophenyl) acrylate, β-thiocyanoethyl α-cyano-β-(p-bromophenyl) acrylate, N-methyl, α-cyano-β-(m-bromophenyl) acrylamide, N-(β-hydroxyethyl)-N-benzyl, α-cyano-β-(o-bromophenyl) acrylamide, N-(2,4,5-trichlorophenyl), α-cyano-β-(m-bromophenyl) acrylamide, N-(α-naphthyl), α-cyano-β-(p-bromophenyl) acrylamide, α-cyano-β-(p-bromophenyl) thiolacrylic acid, ar.-chlorobenzyl α-cyano-β-(o-bromophenyl) thioacrylate, trichloromethyl α-cyano-β-(p-bromophenyl) thiolacrylate, and the like.

To indicate the lack of injury to the growing plants after treatment with the growth regulants of our invention, we continued further observations on plants treated with our growth regulants and found that normal maturity was reached, although usually at a period later than that of the controls. However, by employing extremely dilute solutions, the preliminary effect can be controlled to be of short duration so that a normal growth rate is resumed after only a brief period so that maturity is achieved nearly simultaneously with the controls. By selection of a particular carboxylic derivative and a method and time of application, as well as concentration, control of growth effects can be achieved which are important in determining the ripening time or maturity of a fruit or other yield crop upon which the material is applied. This ability to control the rate of growth and the time of maturity is of extreme importance to the agricultural industry, both to determine in advance the period in which the harvest can be made, and also to overcome dependence upon climatic and other factors normally beyond the control of the grower. Thus if a young crop is planted and adverse growing conditions are encountered, it is possible by employing the compounds of our invention to delay, for example, the setting of fruit until climatic conditions are more favorable for the maturing and ripening of such fruit. Still other methods of employing the novel growth suppression effects of our compounds will be apparent.

To illustrate that the compounds of our invention not only suppress the linear growth of plants but also suppress the rate of maturing. α-cyano-β-(p-bromophenyl) acrylic acid for example at concentrations as low as 0.05 per cent as a total spray, inhibits bud formation in tomato plants for thirty days after treatment, while identical control plants contained blossoms or small fruits at the end of this period. However, upon further growth, the plants developed normally in all respects and produced a harvest of fruit.

The ability to suppress the growth of plant species is not limited to any one class of plants or plant species. Thus, for example, a great variety of important agricultural plant types can be treated with the compounds of our invention and achieve important growth regulation effects. Among the many varieties of plants which have been so treated successfully by the compounds of our invention are included those primarily grown for their flowers, those primarily grown as fruit crops, those primarily grown for the seed yield such as the legumes, corn and grasses, as well as a great variety of woody, herbaceous and ornamental plant species. Illustrative of the wide variety of plant species responding to the growth regulation characteristics of the α-cyano-β-bromophenyl acrylic structure are included such diverse plants as root plants such as radish; blossoms, such as sunflower; and legumes, such as soybeans.

It has long been considered desirable to provide a class of agents capable of preventing the flowering of buds on growing or cut plants. In handling ornamental flowers great losses are incurred by the premature opening of the blossoms and subsequent withering of the plants before the blossoms can be disposed of. The ability to control the opening of the bud to produce a blossom is likewise important among commercial agricultural crops. Heretofore, the materials proposed for this application, while successful to a limited degree in preventing the formation of the flower, have caused more or less deep seated alterations in the color, form or scent of the flower, or have interfered with ability of the flower to produce viable seed. Furthermore, such treatments frequently cause mutations to occur in the seed. We have discovered that when applied to the buds of a great variety of plants, the compounds of our invention are capable of retarding the blossoming period for important lengths of time. Upon eventual opening of a flower bud we have found that the blossom produced is in every way the equivalent of the blossom produced upon the untreated plant. The only apparent change in the growth habit of the plant is in the delayed opening of the blossom and no apparent change or damage to the blossom can be seen. To illustrate this property, plants of the budding dwarf French marigold, when treated with a total aqueous application of typical compounds of our invention, depending upon the concentration applied, delay blossoming for periods of four to twelve days. The flowers eventually produced by the treated plants are, however, normal in color and appearance.

The universal character of the growth suppressant effect of the compounds of our invention is ably illustrated by the observation that growth regulation is achieved by soil treatment of a plant. In such soil treatment, as in foliage treatment, the characteristic axillary branching which our materials sometime initiate is frequently evident. The color of the treated plants is equivalent to that of the untreated plants and on further observation they are observed to resume normal growth.

Another important effect exhibited by the growth regulant compositions of our invention is in the ability to prevent the sprouting of a great variety of tuberous materials. This ability is particularly important in the commercial culture of plants which are tuberous propagated, such as for example, the potato and the turnip. Thus, Irish-Cobbler potatoes treated with α-cyano-β-bromophenyl acrylic growth regulants are inhibited from sprouting for periods of as much as four months under conditions wherein untreated control tubers are fully sprouted.

Our α-cyano-β-bromophenyl acrylic growth regulants are likewise effective in preventing the sprouting of leaves and buds of woody plants. Retardation of growth of woody plants, shrubs or trees is an effect which has important implications in many fields of agriculture. For example, by delaying the budding or blossoming of citrus trees during a period when frost conditions threaten or, in northern climates, to retard the spring budding of fruit trees such as the apple, cherry, pear, peach and the like would in many instances determine the difference between a crop of fruit and a complete loss. Similarly in the treatment of ornamental shrubs and trees, the ability to delay spring blossoming has great utility.

The surprising effectiveness of the α-cyano-β-bromophenyl acrylic growth regulants is evidenced in a variety of formulations and in a great variety of concentrations. For example, growth response is achieved by employing our materials in aqueous solution or in aqueous suspension. In the latter instance it is frequently desirable to employ along with the aqueous suspension a dispersing agent. Examples of such surface-active agents which can be employed in forming dispersions include salts of the alkyl and alkylaryl sulfonates, such as du Pont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples Non-Ionic-218. Still other surface-active agents can be employed, the above merely showing a representative list of the more common materials.

Likewise, it is possible to achieve the growth regulation characteristic of the α-cyano-β-bromophenyl acrylic structure in dry formulations. In such formulations the active ingredient is extended in a solid inert carrier. Typical of such carriers are talc, clay, cellulosic powders or other solid diluents. Such formulations have particular utility in the treatment of seeds, wherein an aqueous application may promote premature germination, or where a solvent application may damage the seed. For certain field crop applications we also prefer a dust formulation wherein a wet application might introduce a certain secondary effect which is undesirable. Further specific examples of such typical inert solid carriers which can be employed as diluents in our dust formulations include fuller's earth, pyrophillite, bentonite, montmorillonite, attaclay, the Filtrols, celite and the like.

The α-cyano-β-bromophenyl acrylic growth regulants of our invention are in many instances soluble in a great variety of solvents. Among the organic solvents which can be employed as the carrier for our active agents we use hydrocarbons, such as benzene, xylene or toluene; ketones, such as acetone, methylethyl ketone and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which we employ are the carbitols and cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

Furthermore a combination of such methods of application can be employed in order to achieve desirable spreading or wetting characteristics. Typical of such formulations include wettable powders wherein the active ingredient is first admixed with a solid carrier as described above in combination with a small amount of dispersing or surface-active agent. The resultant dry formulation can then be added to water for further dilution prior to application and provide a dispersion of the active ingredient and the solid carrier in water. Likewise oil-in-water emulsions can be employed and are sometimes preferred. Typical of such formulations are compositions wherein the active ingredient is first dissolved in an organic solvent either soluble or insoluble in water and this concentrated solution is then added to water with or without a surface active agent to form emulsions suitable for application.

In addition we have found that we can incorporate an adherent or sticking agent such as vegetable oils, naturally occurring gums and other adhesives in our α-cyano-β-bromophenyl acrylic growth regulants. Furthermore we can employ humectants in our formulations. In addition such formulations can be employed in admixture with fungicidal materials, other biocides such as insecticides, larvicides, bactericides, herbicides, growth suppressants, vermicides, miticides or with other materials which are desired to apply along with our growth regulants including such diverse materials as fertilizers.

Having thus described typical α-cyano-β-bromophenyl acrylic growth regulants, methods for their preparation, formulation and application, and having described typical results obtained in their use, we do not intend that our invention be limited except by the appended claims.

We claim:

1. A new composition of matter selected from the group consisting of α-cyano-β-bromophenyl acrylic acid and carboxylic derivatives thereof.

2. A plant response composition consisting essentially of a material selected from the group consisting of monomeric α-cyano-β-(bromophenyl)acrylic acid and carboxylic derivatives thereof, an inert carrier therefor, in amount sufficient to provide a positive plant response, and a surface-active agent.

3. The composition of claim 2 wherein the carrier is a dust.

4. A composition of claim 2 wherein the active ingredient is α-cyano-β-(p-bromophenyl) acrylic acid.

5. As a new composition of matter, α-cyano-β-(p-bromophenyl) acrylic acid.

6. As new compositions of matter, salts of α-cyano-β-bromophenyl acrylic acid.

7. As a new composition of matter, the sodium salt of α-cyano-β-(p-bromophenyl) acrylic acid.

8. As new compositions of matter, esters of α-cyano-β-bromophenyl acrylic acid.

9. As new compositions of matter, nitrogen containing salts of α-cyano-β-bromophenyl acrylic acid.

10. As new compositions of matter, amides of α-cyano-β-bromophenyl acrylic acid.

11. A plant response composition containing as a principal active ingredient in amount sufficient to provide a positive plant response a material selected from the group consisting of monomeric α-cyano-β-(bromophenyl)acrylic acid and carboxylic derivatives thereof.

12. A method for regulating the growth processes of plants which comprises applying thereto a formulation containing as a principal active ingredient in amount sufficient to provide a positive plant response a material selected from the group consisting of monomeric α-cyano-β-(bromophenyl)acrylic acid and carboxylic derivatives thereoef.

13. A wettable powder plant response composition consisting essentially of a material selected from the group consisting of monomeric α-cyano-β-(bromophenyl)acrylic acid and carboxylic derivatives thereof, in amount sufficient to provide a positive plant response, an inert dust carrier, and a surface-active agent.

14. An aqueous plant response composition consisting essentially of a material selected from the group consisting of monomeric α-cyano-β-(bromophenyl)acrylic acid and carboxylic derivatives thereof, in amount sufficient to provide a positive plant response, water, and a surface-active agent.

15. An oil-in-water plant regulant composition consisting essentially of a material selected from the group consisting of monomeric α-cyano-β-(bromophenyl)acrylic acid and carboxylic derivatives thereof in amount sufficient to provide a positive plant response dispersed with a surface-active agent in an oil-in-water emulsion.

References Cited in the file of this patent

UNITED STATES PATENTS

| | | |
|---|---|---|
| 2,326,471 | Lontz | Aug. 10, 1943 |
| 2,394,916 | Jones | Feb. 12, 1946 |
| 2,446,836 | King | Aug. 10, 1948 |

OTHER REFERENCES

Walther et al. in "Beilstein's Handbuch der Organischen Chemie," 4th Edition (1926), vol. 9, page 895.